(12) United States Patent
Bush

(10) Patent No.: US 12,025,859 B1
(45) Date of Patent: Jul. 2, 2024

(54) OPTICAL APPARATUSES FOR ENHANCING SCOTOPIC VISION

(71) Applicant: Robert Bush, Wilsonville, OR (US)

(72) Inventor: Robert Bush, Wilsonville, OR (US)

( * ) Notice: Subject to any disclaimer, the term of this patent is extended or adjusted under 35 U.S.C. 154(b) by 0 days.

(21) Appl. No.: 18/223,772

(22) Filed: Jul. 19, 2023

Related U.S. Application Data

(60) Provisional application No. 63/390,600, filed on Jul. 19, 2022.

(51) Int. Cl.
| | | |
|---|---|---|
| *A61F 2/16* | (2006.01) | |
| *G02C 7/04* | (2006.01) | |
| *G02C 7/06* | (2006.01) | |
| *G02C 7/10* | (2006.01) | |

(52) U.S. Cl.
CPC .................... *G02C 7/104* (2013.01)

(58) Field of Classification Search
CPC ...................................... G02C 7/104
USPC ....................................... 351/159
See application file for complete search history.

(56) References Cited

U.S. PATENT DOCUMENTS

| | | | |
|---|---|---|---|
| 7,434,936 B2 * | 10/2008 | Dai | A61B 3/09 |
| | | | 351/205 |
| 8,154,804 B2 * | 4/2012 | McGinn | G02F 1/134309 |
| | | | 359/666 |
| 8,709,079 B2 * | 4/2014 | Zhang | G02C 7/041 |
| | | | 623/6.31 |
| 9,072,434 B2 | 7/2015 | Thibos | |
| 9,622,856 B2 * | 4/2017 | Weeber | G02C 7/044 |
| 11,302,041 B2 | 4/2022 | Hoffman | |
| 2005/0057720 A1 * | 3/2005 | Morris | G02C 7/06 |
| | | | 351/159.44 |
| 2006/0098162 A1 * | 5/2006 | Bandhauer | G02C 7/042 |
| | | | 351/159.44 |

\* cited by examiner

*Primary Examiner* — Joseph P Martinez
*Assistant Examiner* — Grant A Gagnon
(74) *Attorney, Agent, or Firm* — Mohr Intellectual Property Law Solutions, P.C.

(57) ABSTRACT

Optical apparatuses for enhancing scotopic vision. The optical apparatuses include a lens. In some instances, the optical apparatuses include a frame. The lens has an optical power adapted to focus light specifically under scotopic vision conditions in a user's eye. In some examples, the optical apparatuses include a spectral filter adapted to allow transmission of selected wavelengths of light through the spectral filter.

20 Claims, 11 Drawing Sheets

OPTICAL APPARATUSES FOR ENHANCING SCOTOPIC VISION

CROSS REFERENCE TO RELATED APPLICATIONS

This application claims priority to U.S. Application, Ser. No. 63/390,600, filed on Jul. 19, 2022, which is hereby incorporated by reference for all purposes.

BACKGROUND

The present disclosure relates generally to optical apparatuses. In particular, optical apparatuses for enhancing scotopic vision are described.

Human vision at night differs in key respects to vision during the day. Photopic vision occurs in well-illuminated conditions, such as during the day when the sun brightly illuminates the environment. Scotopic vision occurs in limited illumination conditions, such as at night. Mesopic vision, sometimes also called twilight vision, is a combination of photopic and scotopic vision under low-light (but not necessarily dark) conditions. Mesopic levels range approximately from 0.01 to 3.0 $cd/m^2$ in luminance.

For the sake of simplicity, this document groups scotopic and mesopic vision conditions together and generally refers to them collectively as scotopic vision conditions. The reader should understand throughout this discussion that details with pertinence to scotopic vision conditions apply substantially similarly to mesopic vision conditions.

The human spectral response shifts from a higher wavelength peak response in well illuminated or photopic vision regimes to a lower wavelength peak response in darker environments or scotopic vision regimes. As human vision shift from a photopic vision regime to a scotopic vision regime, rods begin to assume more responsibility for providing information. Cones within an eye are primarily responsible for vision in photopic vision conditions and rods within an eye are primarily responsible for vision in scotopic vision conditions.

The shift in spectral response between photopic and scotopic vision is generally termed mesopic vision. The spectral response shift between photopic and scotopic vision can be enough to change the prescription needed for best visual acuity (focus). Even people with 20/20 vision can be subject to visual acuity issues when shifting between photopic and scotopic vision conditions.

It would be desirable to provide a solution that accounted for visual acuity differences between photopic and scotopic vision conditions. It would be advantageous if an optical apparatus existed that would correct for visual acuity differences between photopic and scotopic vision conditions. People would benefit from an optical apparatus that provided maximum visual acuity under scotopic vision conditions to supplement conventional eyewear (or natural vision) optimized for photopic vision conditions. It would be further beneficial if an optical apparatus existed that filtered out wavelengths of light that are typically out of focus or caused glare under scotopic vision conditions to reduce eyestrain.

Thus, there exists a need for optical apparatuses that improve upon and advance the design of conventional optical apparatuses. Examples of new and useful optical apparatuses relevant to the needs existing in the field are discussed below.

SUMMARY

The present disclosure is directed to optical apparatuses for enhancing scotopic vision. The optical apparatuses include a lens. In some instances, the optical apparatuses include a frame. The lens has an optical power adapted to focus light specifically under scotopic vision conditions in a user's eye. In some examples, the optical apparatuses include a spectral filter adapted to allow transmission of selected wavelengths of light through the spectral filter.

DETAILED DESCRIPTION

Figure 1:
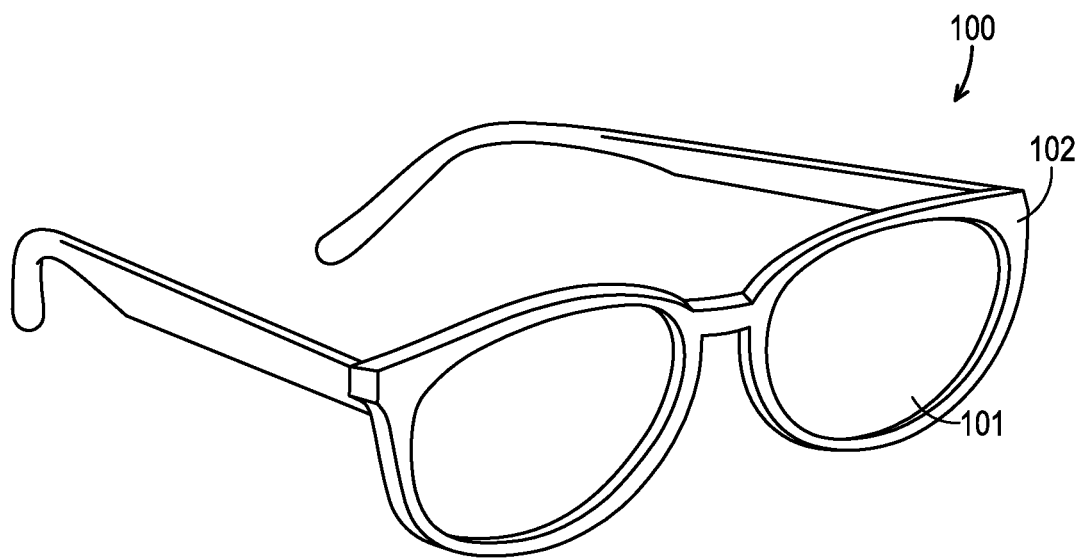
FIG. 1 is a perspective view of a first example of an optical apparatus for enhancing scotopic vision.

The disclosed optical apparatuses will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various optical apparatuses are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Optical Apparatuses for Enhancing Scotopic Vision

With reference to the figures, optical apparatuses for enhancing scotopic vision will now be described. The optical apparatuses discussed herein function to focus light for maximum visual acuity under scotopic vision conditions.

The reader will appreciate from the figures and description below that the presently disclosed optical apparatuses address many of the shortcomings of conventional optical apparatuses. For example, the novel optical apparatuses described below account for and correct visual acuity differences between photopic and scotopic vision conditions. Advantageously, the novel optical apparatuses discussed herein include one or more lenses that provide maximum visual acuity under scotopic vision conditions to supplement eyewear optimized for photopic vision conditions. The novel optical apparatuses also benefit people who do not need eyewear to see clearly under photopic vision conditions by providing improved vision at night than their eyes alone provide.

Another advantage of certain examples of the novel optical apparatuses is that they filter out select wavelengths of light. The wavelengths of light selectively filtered out by the novel optical apparatuses are the wavelengths that are typically out of focus or that cause glare under scotopic vision conditions. By blocking wavelengths of light that are typically out of focus or that cause glare under scotopic vision conditions, the novel optical apparatuses reduce eyestrain.

Contextual Details

Ancillary features relevant to the optical apparatuses described herein will first be described to provide context and to aid the discussion of the optical apparatuses.

Eyeglasses

Figure 2:
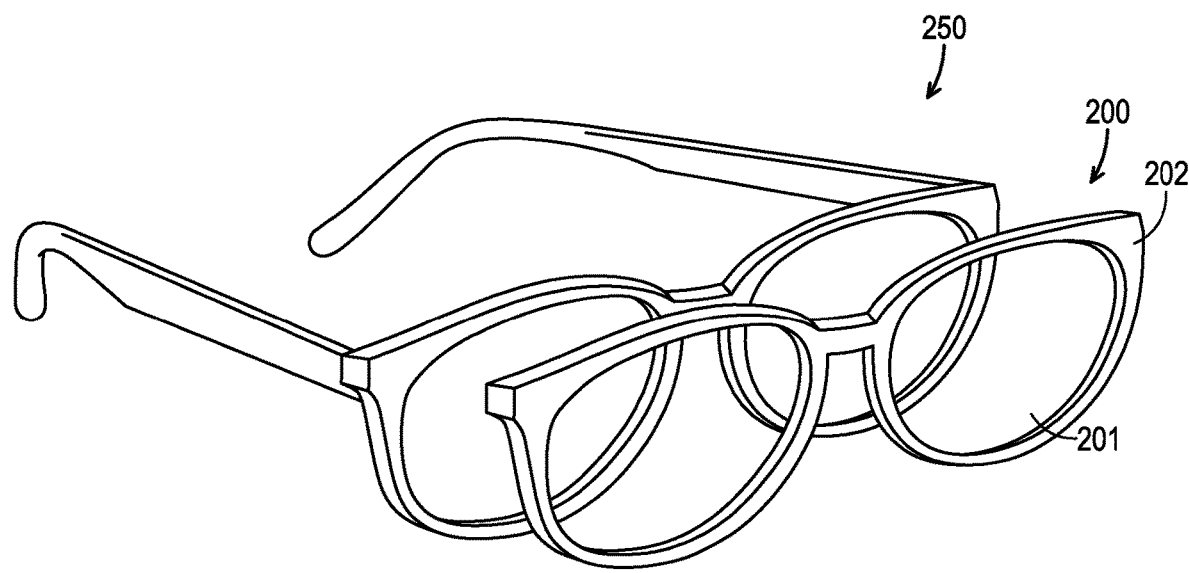
FIG. 2 is a perspective view of a second example of an optical apparatus for enhancing scotopic vision where the optical apparatus is configured to clip onto a pair of eyeglasses.
Figure 3:
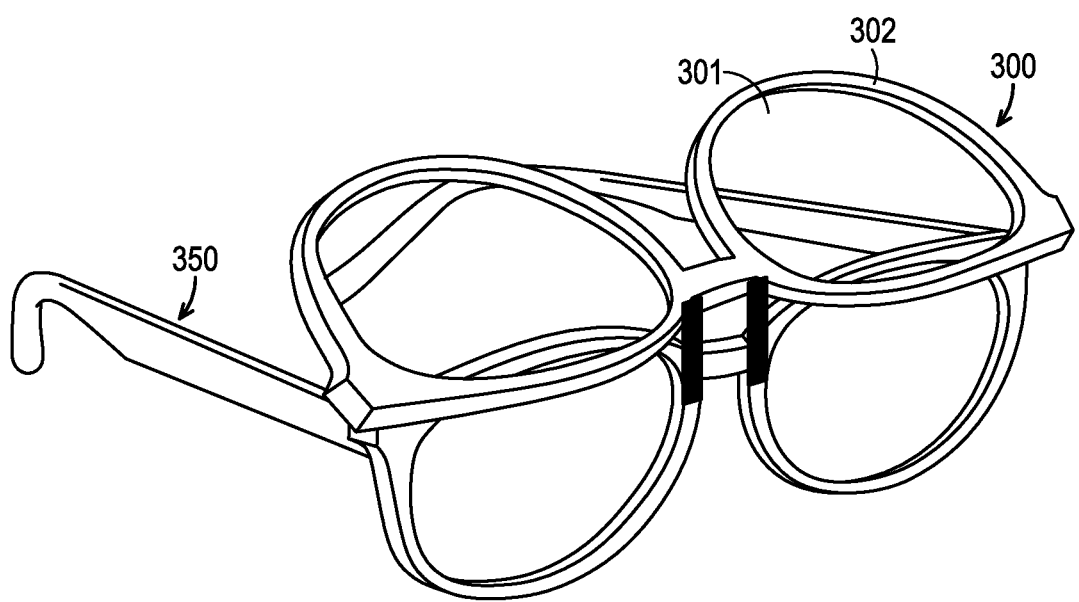
FIG. 3 is a perspective view of a third example of an optical apparatus for enhancing scotopic vision where the optical apparatus is configured to pivot on a pair of eyeglasses.
Figure 4:
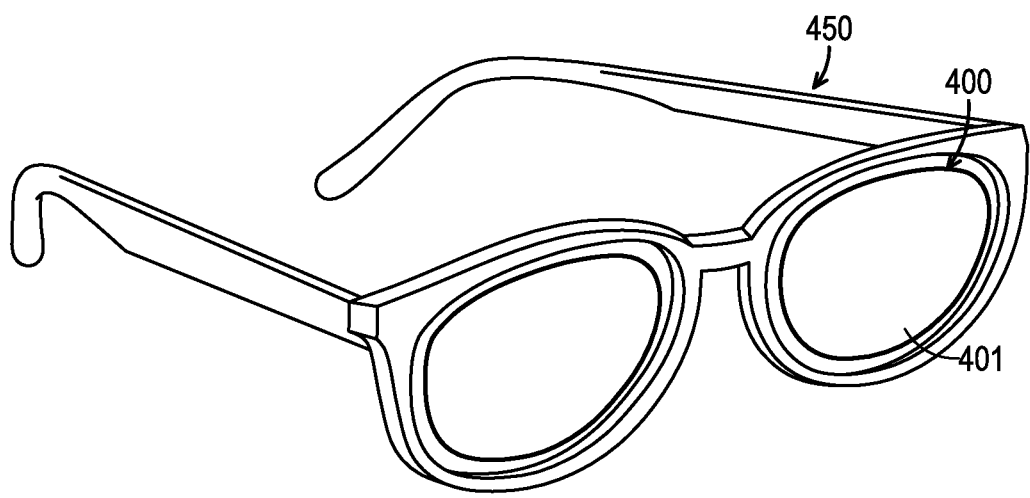
FIG. 4 is a perspective view of a fourth example of an optical apparatus for enhancing scotopic vision where the optical apparatus is configured to adhere to lenses of a pair of eyeglasses.

The novel optical apparatuses discussed in this document are configured to cooperate with eyeglasses or contact lenses in certain examples. For example, FIG. 2 depicts an optical apparatus 200 configured to clip onto a pair of eyeglasses 250. FIG. 3 depicts an optical apparatus 300 configured to pivot on a pair of eyeglasses 350. FIG. 4 depicts an optical apparatus 400 configured to adhere to a lens of a pair of eyeglasses 450.

The optical apparatuses may cooperate with any currently known or later developed type of eyeglasses, such as prescription eyeglasses, sunglasses, or special purpose glasses. Suitable eyeglasses generally include a lens and a frame.

Electronic Display Headsets

In addition to eyeglasses, the optical apparatuses discussed herein may cooperate with electronic display headsets, such as virtual reality headset, augmented reality headsets, or mixed reality headsets. The electronic display headsets may be any currently known or later developed type of electronic display headset.

Optical Apparatus Embodiments

With reference to FIGS. 1-11, optical apparatus examples will now be described. The description will first discuss various configurations the optical apparatuses may adopt and will then discuss features enhancing scotopic vision present in each configuration.

The reader should understand that features with names in common in each optical apparatus example may be similar or identical and will thus not be individually discussed at length. For example, lens 101, lens 201, lens 301, and lens 401 may all be configured the same or highly similarly. Likewise, frame 102, frame 202, and frame 302 may all be configured the same or highly similarly.

As shown in FIG. 1, optical apparatus 100 is in the form of a pair of eyeglasses and includes two lenses 101 and a frame 102. Lenses 101 include an optical filter integrated into the lens; in particular, a spectral filter.

The reader should understand all optical apparatus examples may include a single lens, two lenses, or more than two lenses depending on the needs of the user. In some examples, one or more lenses provide optical correction and one or more lenses allow light to pass through without optical correction.

Each of the optical apparatus examples may include an optical filter. As explained in more detail below in the optical filter section, the optical filter may be a spectral filter, a spatial filter, or a polarization filter. The filter may be a discreet component or may be integrated into the lens.

In FIG. 2, an optical apparatus 200 configured to selectively clip onto a pair of eyeglasses 250 is depicted. Optical apparatus 200 includes a lens 201 and a frame 202.

In FIG. 3, an optical apparatus 300 configured to selectively pivot relative to a pair of conventional eyeglasses 350 is depicted. Optical apparatus 300 includes two lenses 301 and a frame 302.

In FIG. 4, an optical apparatus 400 configured to adhere to a pair of conventional eyeglasses 450 is depicted. Optical apparatus 400 includes two lenses 401. Lenses 401 are configured to adhere to lenses of conventional eyeglasses.

Figure 5:
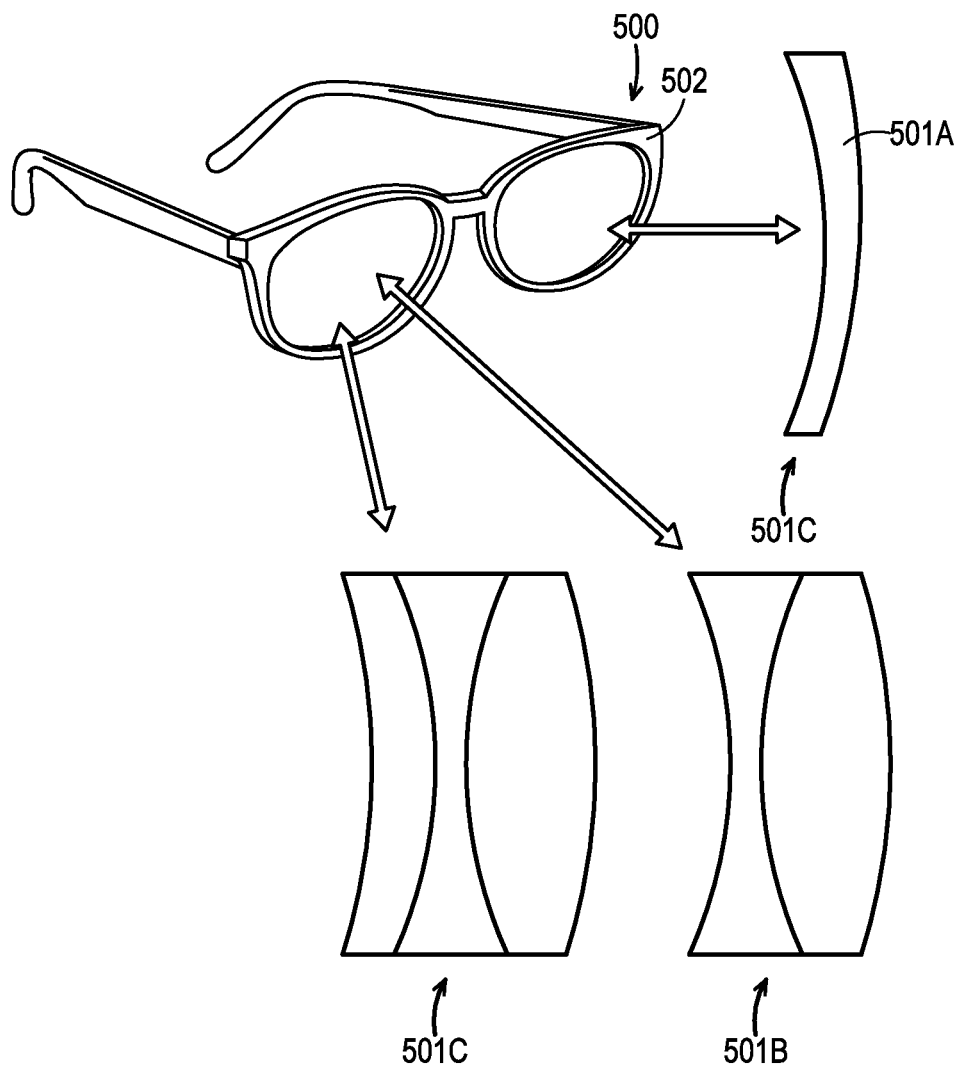
FIG. 5 is a perspective view of a fifth example of an optical apparatus for enhancing scotopic vision with three exemplary lens types depicted.

In FIG. 5, an optical apparatus 500 in the form of eyeglasses is depicted. In addition to frame 502, optical apparatus 500 includes one or more of three exemplary lens options, lens 501A, lens 501B, and 501C.

Lens 501A is a bifocal lens with a top half configured to provide scotopic vision correction and a bottom half configured to provide optical correction for photopic vision conditions. Lens 501E is a doublet lens configured to enhance scotopic vision while maintaining photopic vision. Lens 501C is a triplet lens configured to enhance scotopic vision while maintaining photopic vision.

As discussed above and as shown in FIGS. 1-5, the optical apparatus may take a variety of forms. Non-limiting embodiments include an eyeglass or monocle, a contact lens, a pair of glasses, a clip-on eyeglass frame, or a flip frame. In some examples, the optical apparatus is configured to adhere to a lens of conventional eyeglasses.

The optical apparatuses discussed herein may be used by people with prescription contacts or eyeglasses optimized for photopic vision conditions. Those without need of prescription eyewear under photopic vision conditions can also use the novel optical apparatuses to correct their scotopic and mesopic vision.

An additional or alternative use of the novel optical apparatuses is to correct eyeglasses with out-of-date prescriptions for photopic vision conditions. As discussed below, the optical power of the lenses of the novel optical apparatuses is relatively small. The relatively small optical power of the lenses can be used to supplement or correct minor prescription deficiencies of conventional eyeglasses during photopic vision conditions. Thus, there are applications where the novel optical apparatuses enhance vision acuity during photopic vision conditions in addition to scotopic vision conditions.

Lens

The lens or lenses in the optical apparatuses discussed herein function to optically correct the focus of light entering an eye to enhance scotopic vision. In particular, the lens refracts light to focus the light in the eye for maximum visual acuity under scotopic vision conditions. To explain better how the lens optically corrects the focus of light for maximum visual acuity under scotopic vision conditions, the effects of varying illumination levels on human vision are summarized below in the lens design section and the optical filter section.

The lens may be any currently known or later developed type of lens for vision enhancement or correction. The lens may be an eyeglass lens or a contact lens. The size and shape of the lens may differ from the lenses depicted in the figures.

The lens may be formed from any suitable material currently known or developed in the future. Suitable materials include glass and polymers. In some cases, high dispersion polymers may be advantageous to have a thinner lens. Relatedly, low Abbe number glasses and plastics may be advantageous when addressing chromatic aberration concerns.

As introduced in selected embodiments above, namely, optical apparatuses 200, 300, and 400, the lens may be disposed in series with a lens of conventional eyewear that is prescribed for photopic vision conditions. For example, the lens may be placed in front of, or behind a conventional lens of conventional eyeglasses. In addition, the lens can be configured to adhere to a lens of conventional eyewear. An alternative to a lens in series with a lens of conventional eyeglasses is to prescribe a nighttime only set of glasses. When using multiple lenses, chromatic aberration can be corrected by following achromat or apochromat designs.

As shown in FIG. 5, a lens 501A has a top section having an optical power selected to enhance scotopic vision with a bottom section having an optical power selected to enhance photopic vision. In some examples, such as when a person does not need vision correction under photopic conditions, the bottom section has no optical power. The reader should understand that the lens configuration could be reversed; that is, the bottom section could include an optical power selected to enhance scotopic vision and the top section could have an optical power suitable for photopic conditions. Lens 501A demonstrates that the optical apparatuses described herein may incorporate progressive, bifocal, or trifocal lenses.

In another form, and referring again to FIG. 5, the lens can be a cemented doublet or triplet. For example, lens 501B depicted in FIG. 5 is a cemented doublet. A cemented doublet or triplet design can provide enhancements to low-illumination vision while maintaining good high-illumination vision.

With continued reference to FIG. 5, the lens may include an air-spaced doublet when used as a lens in series or in a telescopic design. Indeed, lens 501C is an air-spaced doublet. Air-spaced doublet designs use materials with different optical dispersions. The different optical dispersions enable enhancing scotopic and mesopic vision while mitigating any negative changes to photopic vision.

Lens Design to Enhance Visual Acuity Under Scotopic Vison Conditions

Figure 6:
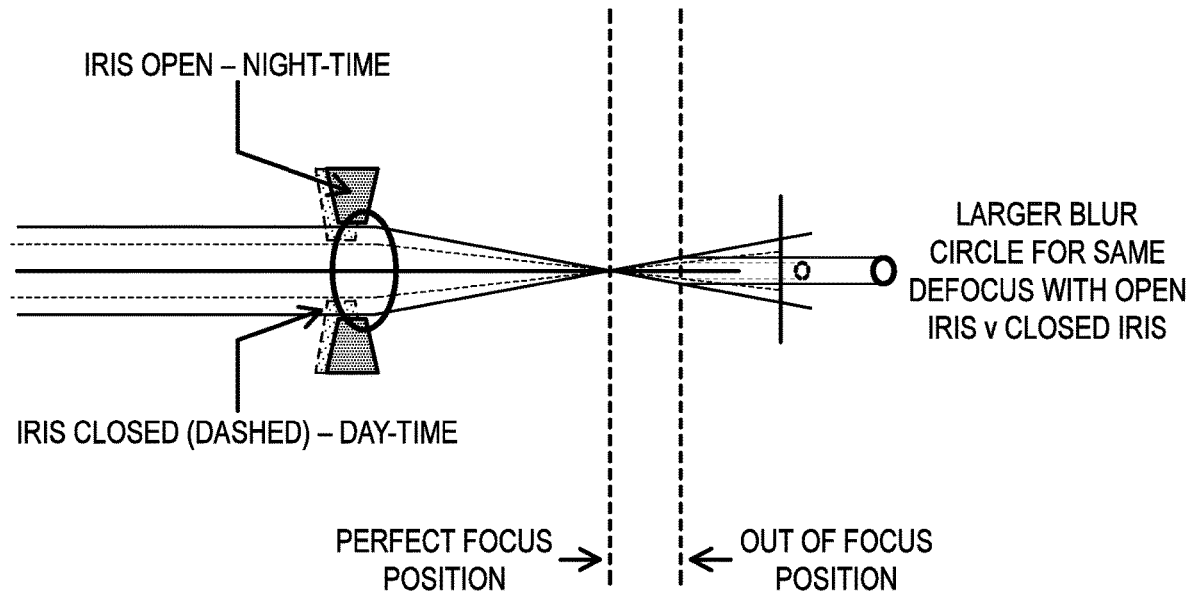
FIG. 6 is a schematic view of a model of human iris changes between illuminated and dark environments and the resulting effects on focus.

Referring to FIGS. 6, the human eye adapts to varying illumination levels with an iris that dilates and contracts in size based on illumination levels. A larger entrance pupil creates a larger circle of confusion or blur circle more quickly for a system slightly out of focus. The pupil dilation, along with the shift in wavelength, may alter the required prescription of eyeglasses or the need for eyeglasses or corrective lenses.

Daytime or photopic vision is dominated by green and red vision with green and red cones in the human retina providing nearly all of the information. When getting a prescription for glasses, the optometrist may provide a duochrome test where the patient is checked for differences in red and green visual acuity. A novel trichrome test conceived by the present inventor provides further diagnostic benefits by evaluating visual acuity over three colors instead of two.

For the duochrome test, the optometrist balances focus between two colors. The duochrome test optimizes focus at a wavelength of approximately 557 nm. However, nighttime vision is spectrally closer to scotopic vision.

In scotopic vision, the rods in a retina are relied upon more than cones. Rods provide greyscale vision in black and white as opposed to color vision like provided by cones. While lacking color information, rods enable good vision with much less illumination than required by cones.

Figure 9:
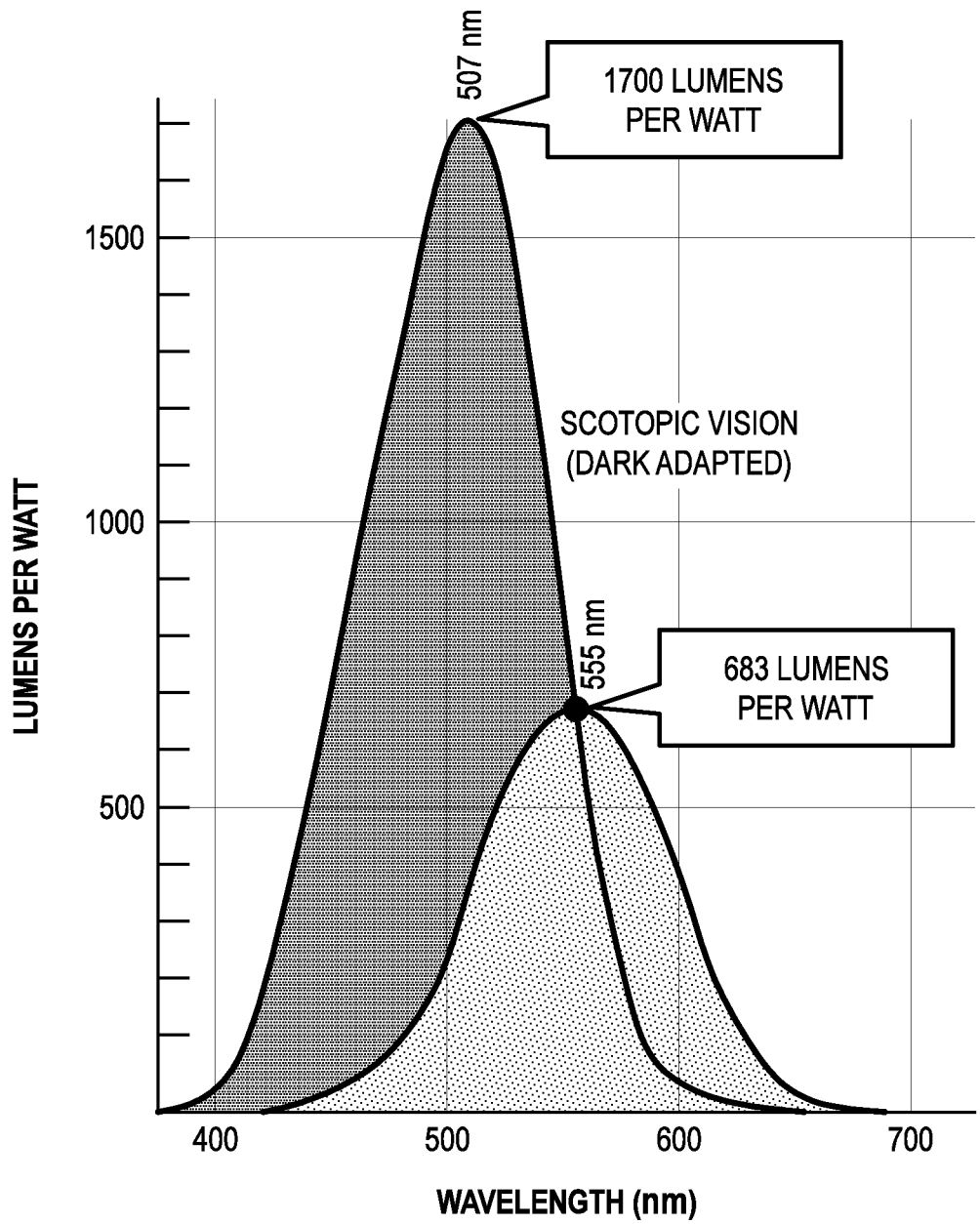
FIG. 9 is a chart of human eye sensitivity to light at different wavelengths under scotopic and photopic vision conditions.
Figure 10:
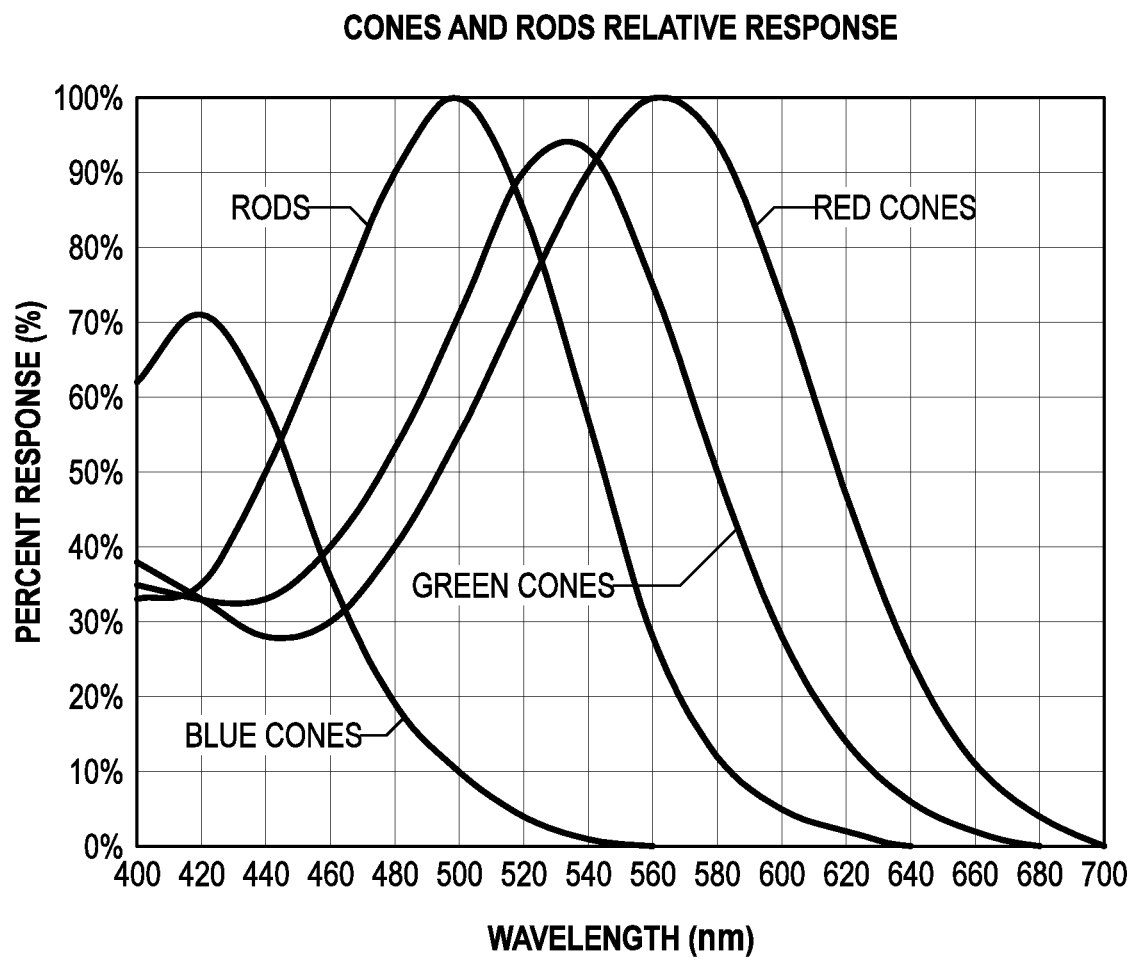
FIG. 10 is a chart of cones and rods response to light at different wavelengths.

As shown in FIGS. 9 and 10, rods have their highest response in a lower waveband of light; namely, between 440 and 540 nm and centered on 507 nm. Individuals may have slight variance from this—namely centered between 502 and 512 nm. This rod sensitivity is different from red and green cone sensitivity—which, when combined, are centered at or near 557 nm.

Figure 11:
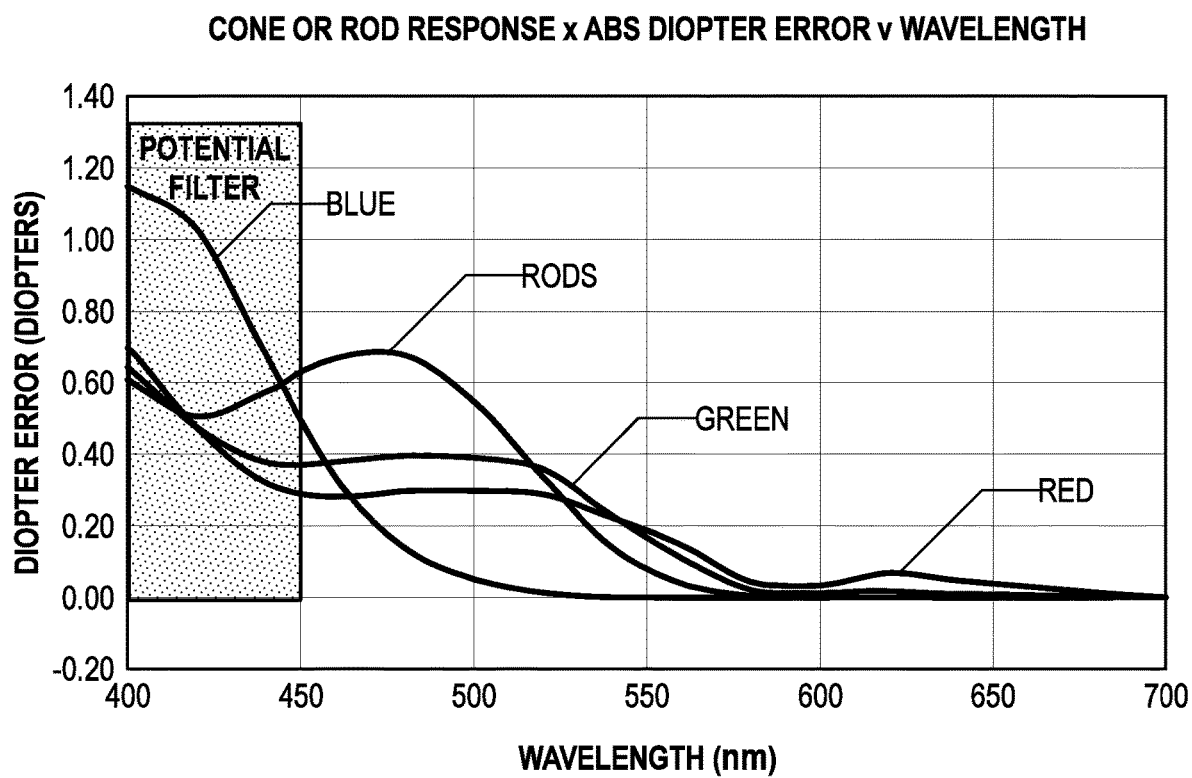
FIG. 11 is a chart of sensitivity times natural diopter error of cones and rods in a human eye at different wavelengths of light in units of diopter error and nanometers along with a depiction of the wavelengths of light that may be selectively blocked by a spectral filter.

As shown in FIG. 11, significant improvement in perceived focus (actual focus times rod response by wavelength) to viewer is possible with an additional lens used for scotopic conditions. This improvement-wavelength band is maximized between 420 and 490 nm, but is beneficial out to 540 nm—a band that encompasses 86% of the light that rods are sensitive to. A lens prescribed under daytime conditions when the eye has a peak response to light at 557 nm or higher will leave vision perceptively out of focus under nighttime conditions when the eye has a peak response to light around 507 nm. The peak wavelength response differences create defocus for scotopic vision, and when combined with the naturally occurring wider iris condition (as noted in FIG. 6) in scotopic vision, leads to eye strain and eye fatigue.

The visual acuity differences of an eye from differences in peak responses to light around 557 nm and 507 nm is enough that corrective lenses will enhance focus and reduce eye strain. In particular, a lens accounting for an eye's difference in peak response wavelengths under different illumination conditions improves focus and reduces eye strain. The lenses in the novel optical apparatuses herein correct for an eye's peak response to light around 507 nm (between 502 and 512 nm) at night versus at 557 nm or higher during the day.

Figure 7:
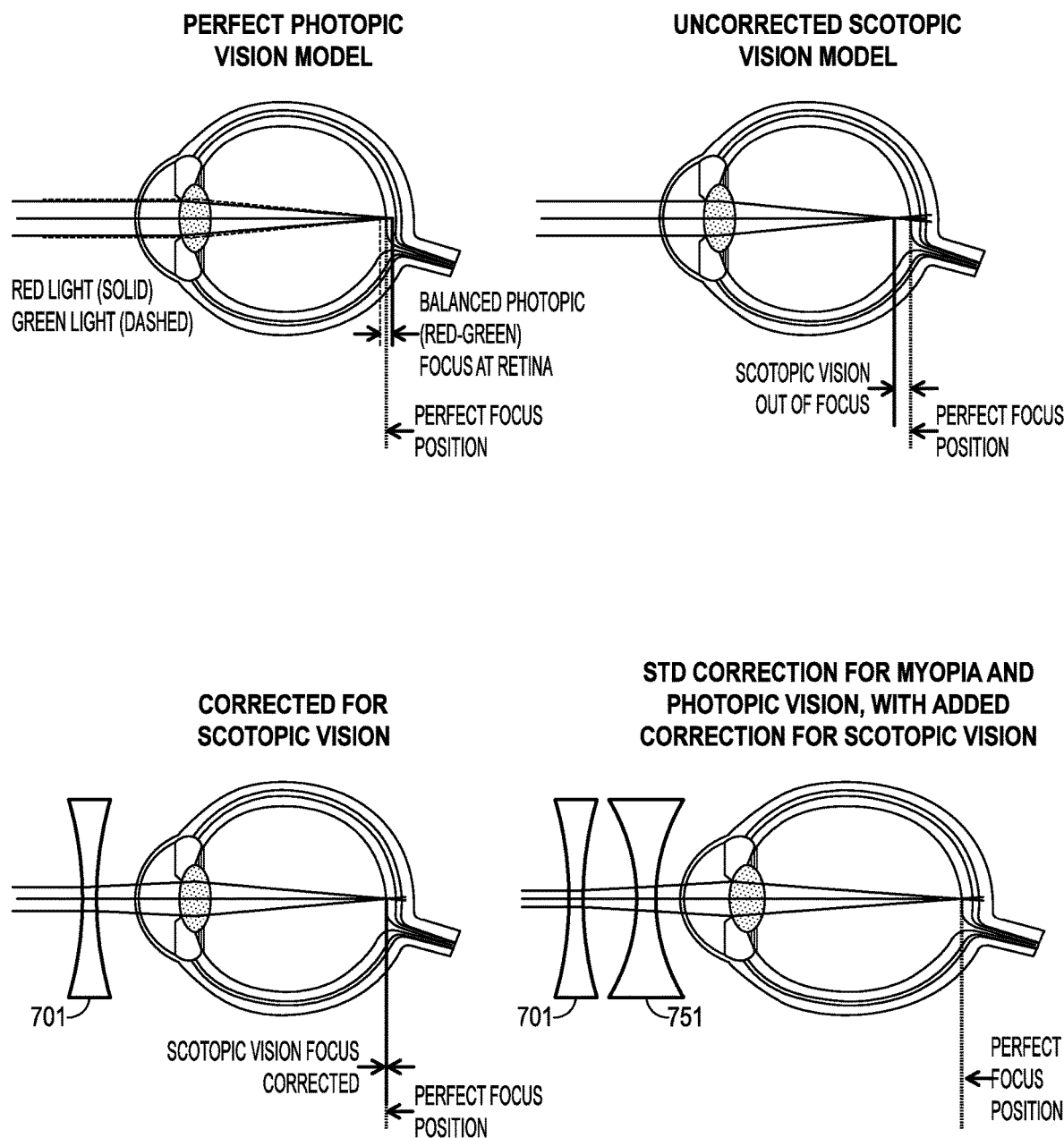
FIG. 7 is schematic views of vision models of a human eye in four different circumstances.

FIG. 7 shows various views of the human eye under photopic and scotopic vision environments. In these views, all objects are considered at a far distance (distance vision) and light rays incoming from the object are nearly parallel. As can be seen in FIG. 7, under ideal photopic vision conditions, the human eye focuses red and green light to the back of the eye or retina. However, objects within the field of vision at the peak wavelengths for scotopic vision focus in front of the retina and appear blurry.

As shown in the bottom left depiction of FIG. 7, the current disclosure provides for scotopic and mesopic correction. In particular, as shown in the bottom left depiction of FIG. 7, a lens 701 of a novel optical apparatus has an optical power configured to focus light on the retina under scotopic and mesopic vision condition. In particular, lens 701 is a negative lens and provides the optical power needed to correct the focus under scotopic or mesopic vision conditions.

Additionally, as shown in the bottom right depiction of FIG. 7, those with myopia can add the lens of the novel optical apparatuses herein to their conventional corrective myopia prescription in series to correct the focus shift. In the bottom right depiction of FIG. 7, lens 701 of the novel optical apparatus is in series with a second negative lens 751 of conventional eyeglasses. Lens 751 of a conventional eyeglasses has a prescription to correct for myopia whereas lens 701 has a prescription to correct for the focus shift that occurs in an eye between photopic and scotopic vision conditions.

Figure 8:
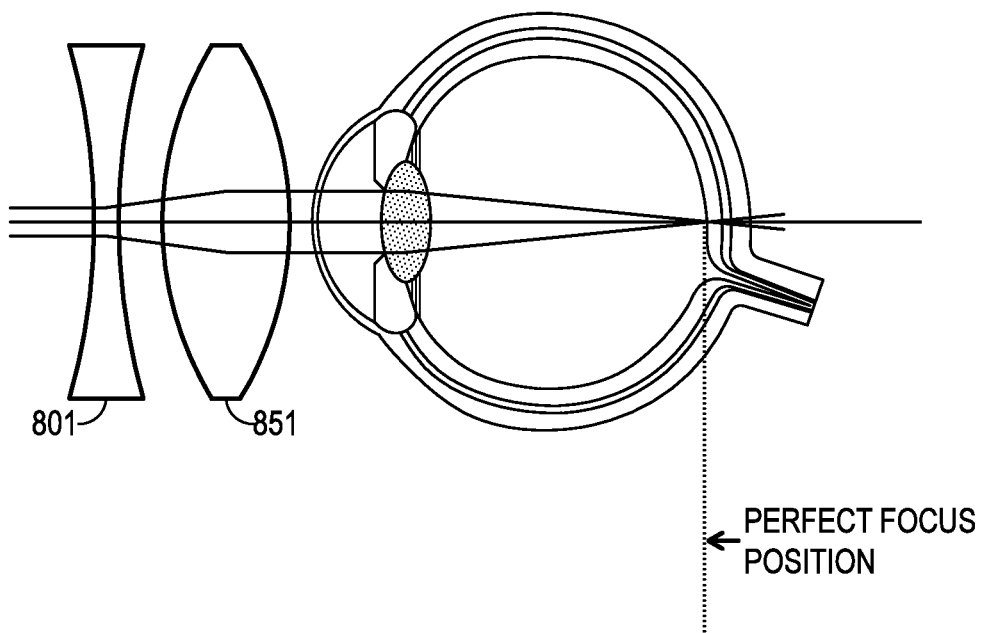
FIG. 8 is a schematic view of a vision model of a human eye with lenses correcting for hyperopia and photopic vision along with a lens correcting for scotopic vision.

As shown in FIG. 8, those with hyperopia can utilize a lens of the novel apparatuses to correct their prescriptive eyewear. With reference to FIG. 8, a lens 801 of the novel optical apparatus is in series with a second lens 851 of conventional eyeglasses. Lens 801 has a negative optical power to correct for the focus shift that occurs in an eye between photopic and scotopic vision conditions. Lens 851 has a positive optical power selected to correct for hyperopia.

The optical power of the lens is determined based on an individual's low light level prescription needs. The optical power of the lens can be prescribed in increments of 0.1 diopters, 1.0 diopters, and combinations thereof.

For a lens disposed in series with prescription eyeglasses, the optical power of the lens is typically between 0.2 and 0.75 diopters. An optical power between 0.2 and 0.75 diopters is similar to the Red-Green duochrome differences observed in past studies. An optical power range of between 0.2 and 0.75 diopters can correct vision from 20/30 to 20/20 vision or from 20/60 to 20/20 vision. Larger and smaller vision changes are possible as well. However, smaller vision changes may be difficult for a user to discern or recognize as an improvement.

In some examples, the optical power of the lens is determined by finding a user's prescription for enhanced night vision. Methods for finding a user's prescription for enhanced night vision can be conducted during a routine eye examination to determine both a traditional photopic prescription and scotopic-prescription according to the presently disclosed methods and optical apparatuses.

One method for finding a user's prescription for enhanced night vision includes allowing a user to adapt to scotopic vision conditions or a desired low-light setting. Once the user has adapted to scotopic vision conditions, the method proceeds to performing a focus test or other eye examination procedure. From the focus vision test or other eye examination procedure, one can then determine the optical power of a prescription lens for scotopic or mesopic vision enhancement.

By way of example, a scotopic eye examination parallels refraction tests administered in routine eye examinations. First, the examinee acclimates to a low light environment, which may involve waiting 20 minutes or more in a low light environment. The eye examination can be performed with the examinee wearing or not wearing prescription eyeglasses or contacts (hereinafter simply eyeglasses).

If performing the examination with prescription eyeglasses, a target is preferably viewed at a distance or virtual distance as corrected with the prescription eyeglasses. If the prescription eyeglasses have progressive lenses, the examinee will need to view the target through the upper (or distance) portion of the prescription eyeglasses.

One vision test is to use a Snellen chart administered in low light conditions and after the client has acclimated to the low light level. Another vision test includes enhancing the traditional duochrome test to include a blue or violet/blue/green target at around 480-520 nm to simulate the eye's scotopic response (spectral shift). Another vision test is to have the client look at small light sources of different colors (for example, holiday tree lights) and to note the best focus for all colors.

Another vision test may be employed to simulate driving conditions and the attendant glare that often occurs when driving at night. The night driving vision test includes having the examinee view incoming headlights of various colors and choosing the best focus option with the least glare.

Optical Filter

The optical filter optionally included in some example of the optical apparatuses discussed herein functions to block light with properties that degrade visual acuity or that add to eyestrain under scotopic vision conditions. For example, an optical filter may be utilized to block wavelengths of light that impair focus due to spectral response shifts of a human eye under scotopic conditions.

Optical filters suitable for the novel optical apparatuses discussed herein include spectral and polarization filters. Suitable filters include blue blocking filters and traditional night vision spectral filters.

With reference to FIGS. 9-11, the reader can see a series of graphs demonstrating spectral response shifts between photopic and scotopic vison. As shown in FIG. 9, human vision has a peak response to light between 502 and 512 nm (centered on approximately 507 nm) under scotopic vision conditions. In contrast, under photopic vision conditions, the human eye has a peak response to light at wavelengths of approximately 555 nm. More granularly, FIG. 10 demonstrates how red and green cones (most active under photopic conditions) have peak responses to light at approximately 560 nm and 535 nm, respectively.

In some examples, the optical filter is a spectral filter configured to block light below 450 nm and to allow higher wavelengths to pass through the filter. FIG. 11 depicts wavelengths of light 450 nm and below filtered by such a spectral filter. The reader can see in the FIG. 11 chart that chromatic aberration is highest for blue cone response at lower wavelengths. Filtering out lower wavelength light can improve overall focus and reduce glare.

However, selecting an optical filter that allows wavelengths lower than 450 nm or not filtering out wavelengths of light at all is contemplated and addressed by the novel optical apparatuses herein. The novel optical apparatuses can correct focus at wavelengths below 450 nm by accounting for the shift in spectral response. Filters blocking out lower wavelengths of light are not necessarily always advantageous as they block a significant amount of the limited total light available at night. The novel apparatuses described herein correct for blurred focus that occurs at lower wavelengths due to chromatic aberration. Thus, allowing wavelengths shorter than 450 nm to pass through the optical apparatus may be advantageous in certain instances to allow more light to enter the eye at night.

Two examples are provided to demonstrate when filtering light may and may not be beneficial. Night-time driving glasses is an example of when filtering would be beneficial. Filtering can beneficially address the adverse effects of blue and blue-ish headlights coming at the user and filtering would be of value.

In contrast, night-time hiking or stargazing glasses may be better suited to not including a spectral filter. Not including a spectral filter for glasses intended for night-time hiking or stargazing beneficially allows more light to pass through the glasses. Every available photon will help the user see better in deeper darkness when hiking at night or stargazing. Further, a small amount of diopter error de-focus is typically less important than more signal (photons) for a user hiking at night or stargazing.

Frame

The frame functions to support the lens or lenses of the optical apparatuses. Further, in some examples the frame functions to couple the optical apparatus to a pair of conventional eyeglasses. Some optical apparatus examples do not include a frame, such as contact lens examples or the optical apparatus 400 example where lens 401 attaches directly to a lens of conventional eyeglasses 450.

The frame may be any currently known or later developed type of eyewear frame. The frame may be any suitable size, shape, and style. Any currently known or later developed material suitable for eyewear may be used to form the frame, such as metals, plastic, and composite materials.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An optical apparatus for selective use under scotopic vision conditions to enhance scotopic vision, comprising:
   a lens shaped to provide a single, first optical power adapted to focus light specifically under scotopic vision conditions in an eye of a user
   wherein:
      the lens is configured to be selectively disposed on or in front of the eye when vision conditions become scotopic and to be selectively moved away from the eye under photopic vision conditions;
      the first optical power is distinct from a second optical power that focuses light in the eye under photopic vision conditions when the lens is not disposed on or in front of the eye; and
      the first optical power is determined based on an observed spectral sensitivity shift of the eye between scotopic vision conditions and photopic vision conditions.

2. The optical apparatus of claim 1, wherein the first optical power is selected based on a focus point in the eye for selected wavelengths of light to which rods of the eye are most sensitive.

3. The optical apparatus of claim 2, wherein the selected wavelengths of light are between 502 nm and 512 nm.

4. The optical apparatus of claim 1, wherein the first optical power is adapted to align the focus of light in the eye under scotopic vision conditions with the focus of light in the eye under photopic vision conditions.

5. The optical apparatus of claim 4, wherein the focus of light under scotopic vision conditions and under photopic vision conditions is at a retina of the eye to provide maximum visual acuity.

6. The optical apparatus of claim 1, wherein the first optical power corrects focus for the user resulting from an observed spectral sensitivity shift of the user between scotopic vision conditions and photopic vision conditions.

7. The optical apparatus of claim 6, wherein the first optical power is negative.

8. The optical apparatus of claim 1 wherein the lens is configured to be selectively positioned within a path of light entering the eye.

9. The optical apparatus of claim 1, further comprising a spectral filter incorporated into the lens in a path of light entering the eye.

10. The optical apparatus of claim 9, wherein the spectral filter is adapted to reduce transmission of restricted wavelengths of light through the spectral filter.

11. The optical apparatus of claim 10, wherein the restricted wavelengths of light are perceived by the user as out of focus under scotopic vision conditions.

12. The optical apparatus of claim 11, wherein the restricted wavelengths of light are below 450 nm.

13. An optical apparatus for selective use under scotopic vision conditions to enhance scotopic vision, comprising:
   a spectral filter adapted to allow transmission of allowed wavelengths of light through the spectral filter; and
   a lens configured to be selectively disposed in a path of the allowed wavelengths of light passing through the spectral filter when vision conditions become scotopic;
   wherein:
      the lens exclusively has a first optical power adapted to focus the allowed wavelengths of light in an eye of a user, under scotopic vision conditions the first optical power is distinct from a second optical power that focuses light in the eye under photopic vision conditions when the lens is not disposed on or in front of the eye.

14. The optical apparatus of claim 13, wherein the allowed wavelengths of light are wavelengths that provide maximum visual acuity under scotopic vision conditions.

15. The optical apparatus of claim 13, wherein the first optical power of the lens corrects focus for the user resulting from an observed spectral sensitivity shift of the user between scotopic vision conditions and photopic vision conditions.

16. The optical apparatus of claim 13, wherein the first optical power of the lens is selected based on best visual acuity in the eye for selected wavelengths of light to which rods of the eye are most sensitive when the user is in scotopic visual conditions.

17. The optical apparatus of claim 16, wherein the selected wavelengths of light are between 502 nm and 512 nm.

18. The optical apparatus of claim 13, wherein the first optical power is negative.

19. An optical apparatus for selective use under scotopic vision conditions to enhance scotopic vision, comprising:

a spectral filter adapted to allow transmission of light at or above 450 nm through the spectral filter into an eye of a user; and a lens having an optical power adapted to refract light into focus in the eye for maximum visual acuity under scotopic vision conditions;

wherein the optical power of the lens is negative and selected based on a focus point in the eye for wavelengths of light between 502 nm and 512 nm wherein the lens is configured to be selectively positioned on or in front of the eye under scotopic vision conditions and configured to be selectively moved away from the eye under photopic vision conditions.

20. The optical apparatus of claim 19, wherein the lens is configured to focus a user's vision in scotopic and mesopic vision conditions and the lens would cause out of focus vision if used in photopic vision conditions.

* * * * *